United States Patent
Ko et al.

(10) Patent No.: US 10,588,006 B2
(45) Date of Patent: Mar. 10, 2020

(54) METHOD AND DEVICE FOR CONTROLLING TARGET DEVICE OF HOST AND CLIENT

(71) Applicant: Samsung Electronics Co., Ltd., Suwon-si, Gyeonggi-do (KR)

(72) Inventors: Chang-Gun Ko, Suwon-si (KR); Hun Lim, Yongin-si (KR); Jae-Eun Kang, Suwon-si (KR); Yu-Mi Sohn, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 82 days.

(21) Appl. No.: 15/025,755

(22) PCT Filed: Nov. 25, 2014

(86) PCT No.: PCT/KR2014/011364
§ 371 (c)(1),
(2) Date: Mar. 29, 2016

(87) PCT Pub. No.: WO2015/076640
PCT Pub. Date: May 28, 2015

(65) Prior Publication Data
US 2016/0219494 A1    Jul. 28, 2016

(30) Foreign Application Priority Data

Nov. 25, 2013 (KR) .................. 10-2013-0144122
Jul. 17, 2014 (KR) .................. 10-2014-0090443

(51) Int. Cl.
*H04W 8/00* (2009.01)
*H04W 48/18* (2009.01)
*H04M 1/725* (2006.01)

(52) U.S. Cl.
CPC ....... *H04W 8/005* (2013.01); *H04M 1/72533* (2013.01); *H04W 48/18* (2013.01)

(58) Field of Classification Search
None
See application file for complete search history.

(56) References Cited

U.S. PATENT DOCUMENTS 9,136,913 B2 *   9/2015   Schultz ............... H04B 5/0043
2007/0223401 A1   9/2007   Chatterjee et al.
(Continued)

FOREIGN PATENT DOCUMENTS

CN           102158522 A     8/2011
KR   10-2007-0016205 A     2/2007
(Continued)

OTHER PUBLICATIONS

Chinese Office Action dated Jan. 23, 2019, issued in Chinese Patent Application No. 201480064176.1.
(Continued)

*Primary Examiner* — Thinh D Tran
(74) *Attorney, Agent, or Firm* — Jefferson IP Law, LLP

(57) ABSTRACT

Exemplary embodiments of the present disclosure provide a method and apparatus for controlling a target device of a host and a client for supporting a service for the target device which has connectivity not supported by the host. According to an exemplary embodiment of the present disclosure, the method for controlling the target device of the host includes: receiving, from a first client having the same connectivity as that of at least one target device, target information on the target device, and managing the target information; and, when a service request signal for the target device is received from a second client, transmitting, to the target device, a service control signal for controlling the target device using the target information.

16 Claims, 12 Drawing Sheets

(56) References Cited

U.S. PATENT DOCUMENTS

| | | | |
|---|---|---|---|
| 2008/0037485 A1* | 2/2008 | Osinga | H04L 45/00 370/338 |
| 2010/0250663 A1 | 9/2010 | Han et al. | |
| 2011/0047258 A1 | 2/2011 | Griswold, Jr. et al. | |
| 2011/0163858 A1 | 7/2011 | Ohashi | |
| 2012/0021684 A1 | 1/2012 | Schultz et al. | |
| 2012/0086563 A1* | 4/2012 | Arling | G06F 3/0486 340/12.52 |
| 2012/0242526 A1* | 9/2012 | Perez | G08C 17/02 341/176 |
| 2013/0091279 A1 | 4/2013 | Haddad et al. | |
| 2013/0249679 A1* | 9/2013 | Arling | G08C 19/00 340/12.22 |
| 2016/0278006 A1* | 9/2016 | Lee | H04W 76/10 |

FOREIGN PATENT DOCUMENTS

| | | |
|---|---|---|
| KR | 10-2009-0039144 A | 4/2009 |
| WO | 2013/054260 A1 | 4/2013 |

OTHER PUBLICATIONS

Korean Office Action dated Feb. 22, 2019, issued in Korean Patent Application No. 10-2014-0090443.
Korean Office Action dated Aug. 29, 2019, issued in Korean Patent Application No. 10-2014-0090443.

\* cited by examiner

METHOD AND DEVICE FOR CONTROLLING TARGET DEVICE OF HOST AND CLIENT

TECHNICAL FIELD

The present disclosure relates to technology for controlling a target device, and more particularly, to technology for providing a service regarding a target device according to whether connectivity is the same as host connectivity or not.

BACKGROUND ART

Target devices installed in a home are discovered, stored and managed by a host (gateway). A normal method for the host to store neighboring target devices discovers, by the host, a target device and stores information of the target device, connectivity information of the target device, and location information of the target device. In this case, only the target device having connectivity supported by the host is discovered, and only the discovered target device is controlled and monitored. In addition, with respect to the target devices managed by the host, clients use various services using the information of the target devices.

In order to control a target device having different connectivity, a related-art method uses a device serving as a bridge, and thus controls the target device as if the device has homogeneous connectivity. For example, when a user controls an LED lamp which supports Zigbee with a smart phone which supports WiFi but does not support Zigbee, a bridge device may be used. That is, the bridge simply converts a command transmitted from the smart phone through WiFi into Zigbee, thereby controlling the LED lamp having the connectivity of Zigbee.

However, since the host cannot discover a target device which has connectivity not supported by the host, a client cannot use various services provided by the host. For example, when the host has connectivity of WiFi and Zigbee, the client cannot discover a target device supporting Bluetooth, such as a coffee maker or a speaker, through the host, and thus cannot use a service through the host. That is, the client may establish an AV room and provide an environment making a user feel as if the user is in a movie theater through a movie mode, and through a TV (WiFi) and an LED (Zigbee), but the speaker which is not supported by the host cannot interwork with the TV and the LED. In addition, when the client wants to drink coffee at desired time after a meal and thus intends to control the coffee maker having the connectivity of Bluetooth, a trigger signal is required to turn on the coffee maker, but the coffee maker does not interwork with other devices (TV or LED) and thus the client has no choice but to operate a timer for a predetermined time, which may cause inconvenience.

DISCLOSURE OF INVENTION

Technical Problem

An object to be solved by the present disclosure is to provide a method and device for controlling a target device of a host and a client, which enables the client to control a target device having connectivity not supported by the host in providing a smart home service.

Solution to Problem

According to an exemplary embodiment of the present disclosure, a method for controlling a target device of a host includes: receiving, from a first client having the same connectivity as that of at least one target device, target information on the target device, and managing the target information; and, when a service request signal for the target device is received from a second client, transmitting, to the target device, a service control signal for controlling the target device using the target information.

The host may have the same connectivity as that of the first client.

The first client may correspond to another target device having the same connectivity as those of the host and the target device.

The target device may have connectivity which is not supported by the host.

The target information may include at least one of target identification information of the target device and target connectivity information of the target device, client identification information of the first client, target location information of the target device, and owner identification information regarding authority to use the target device.

The receiving and managing the target information includes: transmitting, to the first client, a discovery request signal for discovering the target device; receiving, from the first client, the target information corresponding to a result of discovering the target device; determining whether the host supports connectivity that the target device has using the received target information; and storing connectivity support information corresponding to the target device as the target information.

The service control signal may correspond to a control signal for interworking with at least one other target device.

The transmitting the service control signal to the target device may include: determining whether a service request signal for the target device is received from the second client or not; when the service request signal is received, determining whether target identification information corresponding to the service request signal is identical to the target identification information included in the received target information; when the target identification information corresponding to the service request signal is identical to the target identification information included in the target information, determining whether connectivity of the target device is the same as connectivity supported by the host using the connectivity support information included in the target information; and, when the connectivity of the target device is not the same as the connectivity supported by the host, generating the service control signal and transmitting the generated service control signal to the target device through the first client.

The transmitting the service control signal to the target device may further include; when the connectivity of the target device is the same as the connectivity supported by the host, generating the service control signal and directly transmitting the generated service control signal to the target device.

The transmitting the service control signal to the target device includes: determining whether owner identification information of the target device corresponding to the service request signal corresponds to common identification information for allowing all clients to share a service; when the owner identification information does not correspond to the common identification information, determining whether the owner identification information is identical to identification information of the second client; and, when the owner identification information is identical to the identification information of the second client or corresponds to the common identification information, generating a service control signal for a service having a non-limited service range and transmitting the generated service control signal to the target device.

The transmitting the service control signal to the target device may further include, when the owner identification information is not identical to the identification information of the second client, generating a service control signal for a service having a limited service range and transmitting the limited service control signal to the target device.

The transmitting the service control signal to the target device may further include, when the owner identification information is not identical to the identification information of the second client, generating an error message indicating that it is impossible to support a service, and transmitting the generated error message to the second client.

According to another exemplary embodiment of the present disclosure, a method for controlling a target device of a client includes: discovering at least one target device having the same connectivity as that of the client; transmitting target information on the discovered target device to a host; and, when a service control signal for controlling the target device is received from the host, transmitting the service control signal to the target device.

The client may have the same connectivity as those of the host and the target device.

The client may correspond to another target device having the same connectivity as those of the host and the target device.

The target device may have connectivity which is not supported by the host.

The target information may include at least one of target identification information of the target device and target connectivity information of the target device, client identification information of the client, target location information of the target device, and owner identification information regarding authority to use the target device.

The method for controlling the target device of the client may further include, after transmitting the target information to the host, transmitting a service request signal for the target device to the host.

The transmitting the service control signal to the target device may include transmitting a service control signal for the service having the non-limited service range or a service control signal for the service having the limited service range to the target device according to whether identification information of the client is identical to owner identification information.

The service control signal may correspond to a control signal for interworking with at least one other target device.

According to another exemplary embodiment of the present disclosure, an apparatus for controlling a target device of a host includes: a host interface configured to receive, from a first client having the same connectivity as that of at least one target device, target information on the target device; an information manager configured to store and manage the received target information; and a host controller configured to, when a service request signal for the target device is received from a second client, generate a service control signal for controlling the target device using the target information, wherein the host interface is configured to transmit the service control signal to the target device under control of the host controller.

The host may have the same connectivity as that of the first client.

The first client may correspond to another target device having the same connectivity as those of the host and the target device.

The target device may have connectivity which is not supported by the host.

The target information may include at least one of target identification information of the target device and target connectivity information of the target device, client identification information of the first client, target location information of the target device, and owner identification information regarding authority to use the target device.

The host controller may be configured to control to transmit, to the first client, a discovery request signal for discovering the target device, and, when the host interface receives, from the first client, the target information corresponding to a result of discovering the target device, the information manager may be configured to determine whether the host supports connectivity that the target device has using the received target information, and store connectivity support information corresponding to the target device as the target information.

The service control signal may correspond to a control signal for interworking with at least one other target device.

The host controller may be configured to control to determine whether a service request signal for the target device is received from the second client or not, determine whether target identification information corresponding to the service request signal is identical to target identification information included in the received target information, determine whether connectivity of the target device is the same as connectivity supported by the host using connectivity support information included in the target information, and, when the connectivity of the target device is not the same as the connectivity supported by the host, generate the service control signal and transmit the generated service control signal to the target device-through the first client.

When the connectivity of the target device is the same as the connectivity supported by the host, the host controller may be configured to generate the service control signal and directly transmit the generated service control signal to the target device.

The host controller may be configured to control to determine whether owner identification information of the target device corresponding to the service request signal corresponds to common identification information for allowing all clients to share a service, determine whether the owner identification information is identical to identification information of the second client, and, when the owner identification information is identical to the identification information of the second client or corresponds to the common identification information, generate a service control signal which for the service having the non-limited service range and transmit the generated service control signal to the target device.

The host controller may be configured to control, when the owner identification information is not identical to the identification information of the second client, generate a service control signal for the service having the limited service range and transmit the limited service control signal to the target device.

When the owner identification information is not identical to the identification information of the second client, the host controller is configured to generate an error message indicating that it is impossible to support a service, and transmitting the generated error message to the second client.

According to another exemplary embodiment of the present disclosure, an apparatus for controlling a target device of a client includes: a device discovery unit configured to discover at least one target device having the same connectivity as that of the client; a client controller configured to control to extract target information on the discovered target device, and transmit the extracted target information to a host; and a client interface configured to transmit the target information to the host under control of the client controller, wherein, when the client interface receives a service control signal for controlling the target device from the host, the client controller is configured to control to transmit the service control signal to the target device.

The client may have the same connectivity as those of the host and the target device.

The client may correspond to another target device having the same connectivity as those of the host and the target device.

The target device may have connectivity which is not supported by the host.

The target information may include at least one of target identification information of the target device and target connectivity information of the target device, client identification information of the client, target location information of the target device, and owner identification information regarding authority to use the target device.

The apparatus may further include a user interface configured to receive an input of a discovery request for the target device and set at least one of target location information of the target device and owner identification information on authority to user the target device, and the client controller may be configured to control to transmit at least one of the set target location information and the set owner identification information to the host, and the client interface may be configured to transmit at least one of the set target location information and the set owner identification information to the host.

The user interface may be configured to display at least one of the target identification information, the target connectivity information, the target location information, and the owner identification information.

The client controller may be configured to control to transmit a service request signal for the target device to the host, and the client interface may be configured to transmit the service request signal to the host.

The client controller may be configured to control to transmit a service control signal for the service having the non-limited service range or a service control signal for the service having the limited service range to the target device according to whether identification information of the client is identical to owner identification information.

The service control signal may correspond to a control signal for interworking with at least one other target device.

Advantageous Effects of Invention

According to the present disclosure, even when a target device has connectivity not supported by a host, a client can use all services provided by the host. That is, a user can use the target device which is not supported by the host in the same environment as other target devices without a separate hub device.

In addition, simple connection as in an existing hub device can be performed, and also, security can be set for a target device having heterogenous connectivity not supported by the host.

BRIEF DESCRIPTION OF DRAWINGS

For a more complete understanding of the present disclosure and its advantages, reference is now made to the following description taken in conjunction with the accompanying drawings, in which like reference numerals represent like parts.

BEST MODE FOR CARRYING OUT THE INVENTION

FIGS. 1 to 12 used in this specification to explain the principles of the present disclosure are merely examples and should not be interpreted as limiting the scope of the present disclosure. A person skilled in the related art could understand that the principles of the present disclosure can be implemented in a wireless communication system appropriately arranged.

Figure 1:
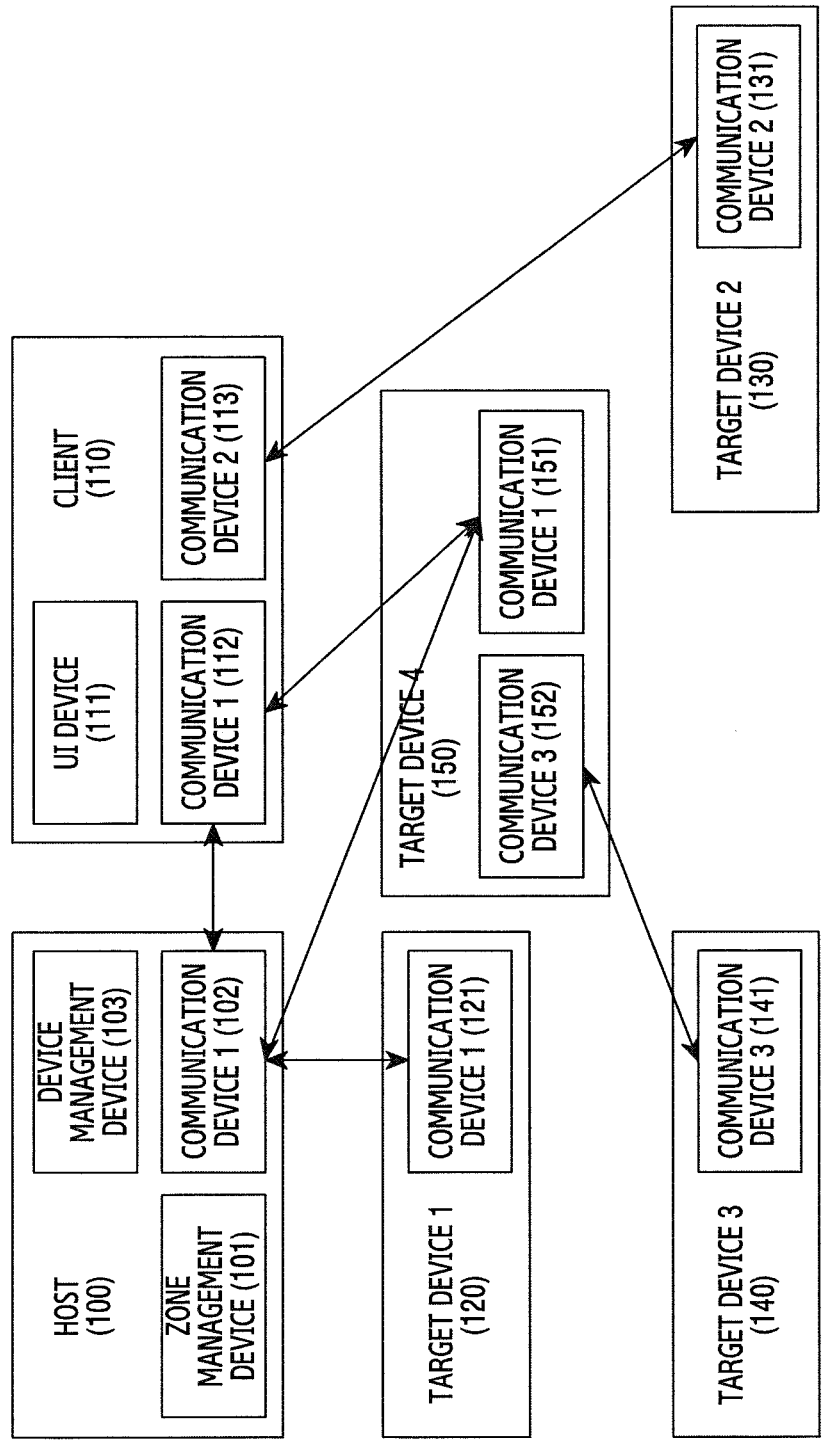
FIG. 1 is a diagram of a device according to an exemplary embodiment of the present disclosure.

FIG. 1 is a reference view illustrating an example of a diagram of a device according to the present disclosure. As shown in FIG. 1, the present disclosure includes a host 100, a client 110, and a plurality of target devices 1-4 120, 130, 140, and 150.

The host 100 includes a zone management device 101, communication device 1 102, and a device management device 103.

The zone management device 101 manages the locations of target device 1 120, target device 2 130, target device 3 140, and target device 4 150.

Communication device 1 102 indicates a type of connectivity of a network which can be supported by the host 100.

Communication device 1 102 has the same connectivity as those of communication device 1 112 of the client 110, communication device 1 121 of target device 1 120, and communication device 1 151 of target device 4 120.

The device management device 103 discovers target devices 1-4 120, 130, 140, and 150 using communication device 1 102, and stores and manages information on discovered target devices 1-4 120, 130, 140, and 150.

With respect to target devices 1-4 120, 130, 140, and 150 managed by the device management device 103, the zone management device 101 provides a user with information on in which zone a specific target device is located.

The client 110 includes a UI device 111, communication 1 112, and communication device 2 113.

The UI device 111 may perform interaction with the user, and display information related to a location provided by the zone management device 101 of the host 100.

Communication device 1 112 has the same connectivity as that of communication device 1 102 of the host 100, and receives information from the device management device 103 of the host 100. In addition, communication device 1 112 has the same connectivity as that of communication device 1 151 of target device 4 150, and accordingly, the client 110 may control and manage target device 4 150.

Communication device 2 113 has the same connectivity as that of communication device 2 131 of target device 2 130. Communication device 2 113 has connectivity which is not supported by the host 100, but is a device which connects the client 110 and target device 2 130.

Target device 1 120 includes communication device 1 121, and communication device 1 121 has the same connectivity as that of communication device 1 102 of the host 100.

Target device 2 130 includes communication device 2 131. Communication device 2 131 has connectivity which is not supported by the host 100, and has the same connectivity as that of communication device 2 113 of the client 110.

Target device 3 140 includes communication device 3 141. Communication device 3 141 has connectivity which is not supported by the host 100 and has the same connectivity as that of communication device 3 152 of target device 4 150.

Target device 4 150 includes communication device 1 151 and communication device 3 152. Communication device 1 151 has the same connectivity as those of communication device 1 102 of the host 100 and communication device 1 112 of the client 110. In addition, communication device 3 152 has the same connectivity as that of communication device 3 141 of target device 3 140, and accordingly, target device 4 150 is connected with target device 3 140 through communication device 3 152.

The present disclosure relates to a method for supporting a service of a host by storing a target device having connectivity not supported by the host in the host. When a client of a user supports connectivity not supported by the host, a target device which is discovered and managed by the corresponding connectivity may be stored in the host, and may provide a service provided by the host.

Figure 2:
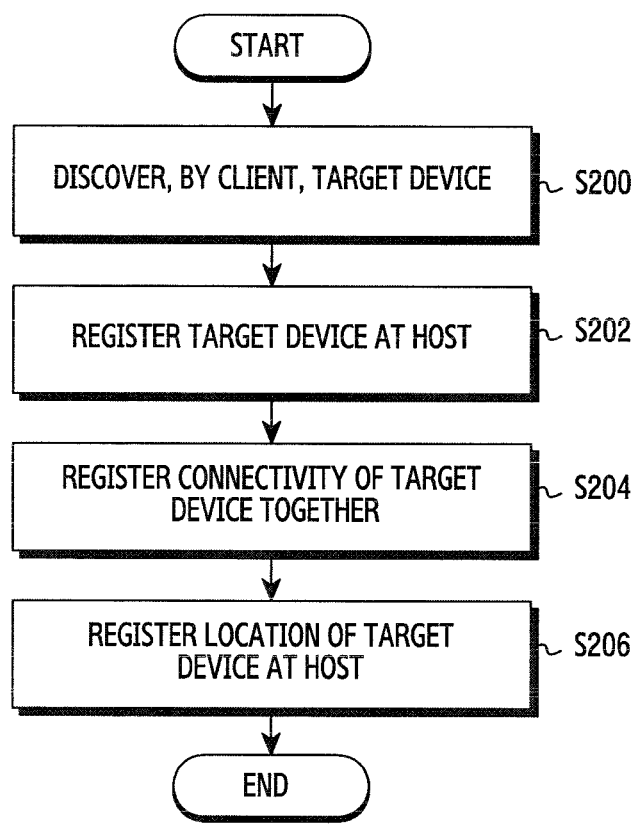
FIG. 2 is a flowchart for discovering and storing a target device according to an exemplary embodiment of the present disclosure.

FIG. 2 is a flowchart showing an example of discovering and storing a target device according to an exemplary embodiment of the present disclosure. As shown in FIG. 2, when a client has the same connectivity with respect to a target device having connectivity not supported by a host, the client directly discovers the target device (S200), and then stores the corresponding target device in the host (S202). In storing, the client stores information of the connectivity supported by the corresponding target device and/or owner information (S204). Herein, the owner information refers to authority to use the target device. In addition, the location of the target device is stored in the host device (S206).

Figure 3:
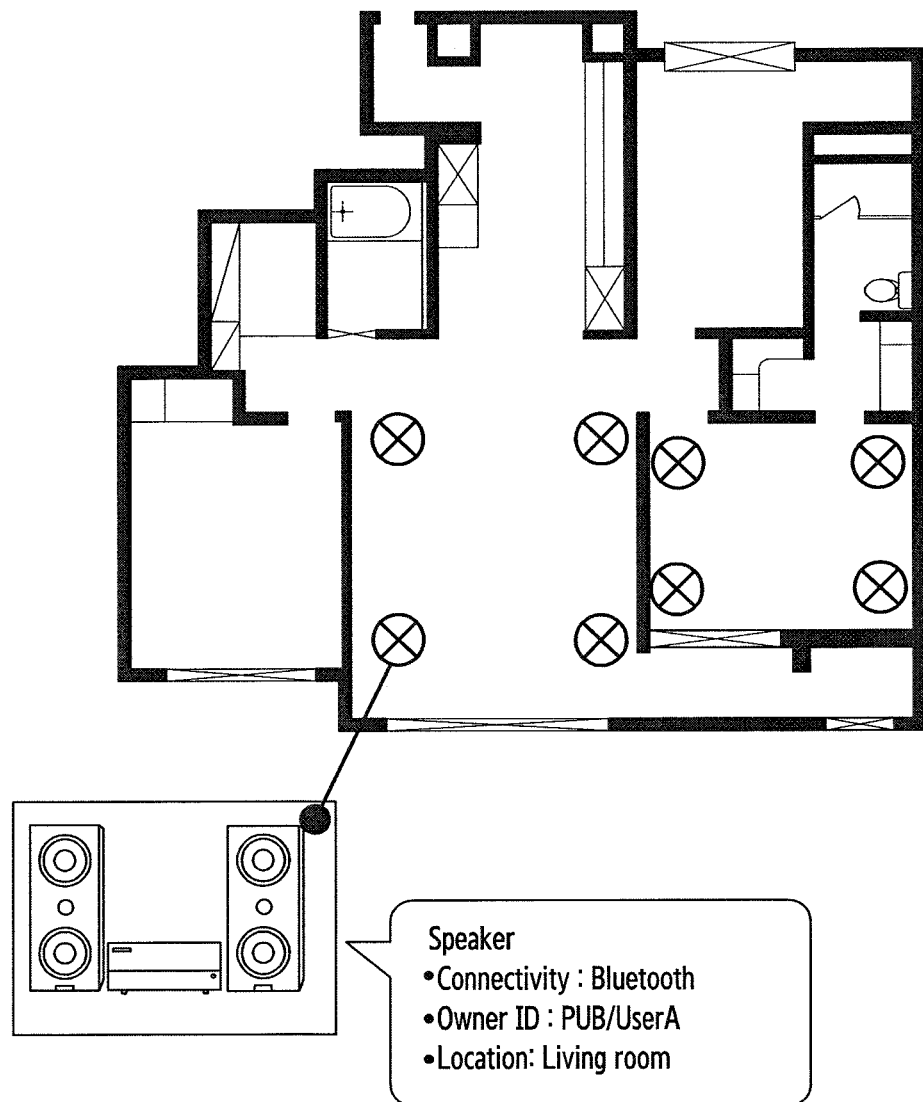
FIG. 3 is a view showing an example of designating a location of a target device by a client device according to an exemplary embodiment of the present disclosure.
Figure 4:
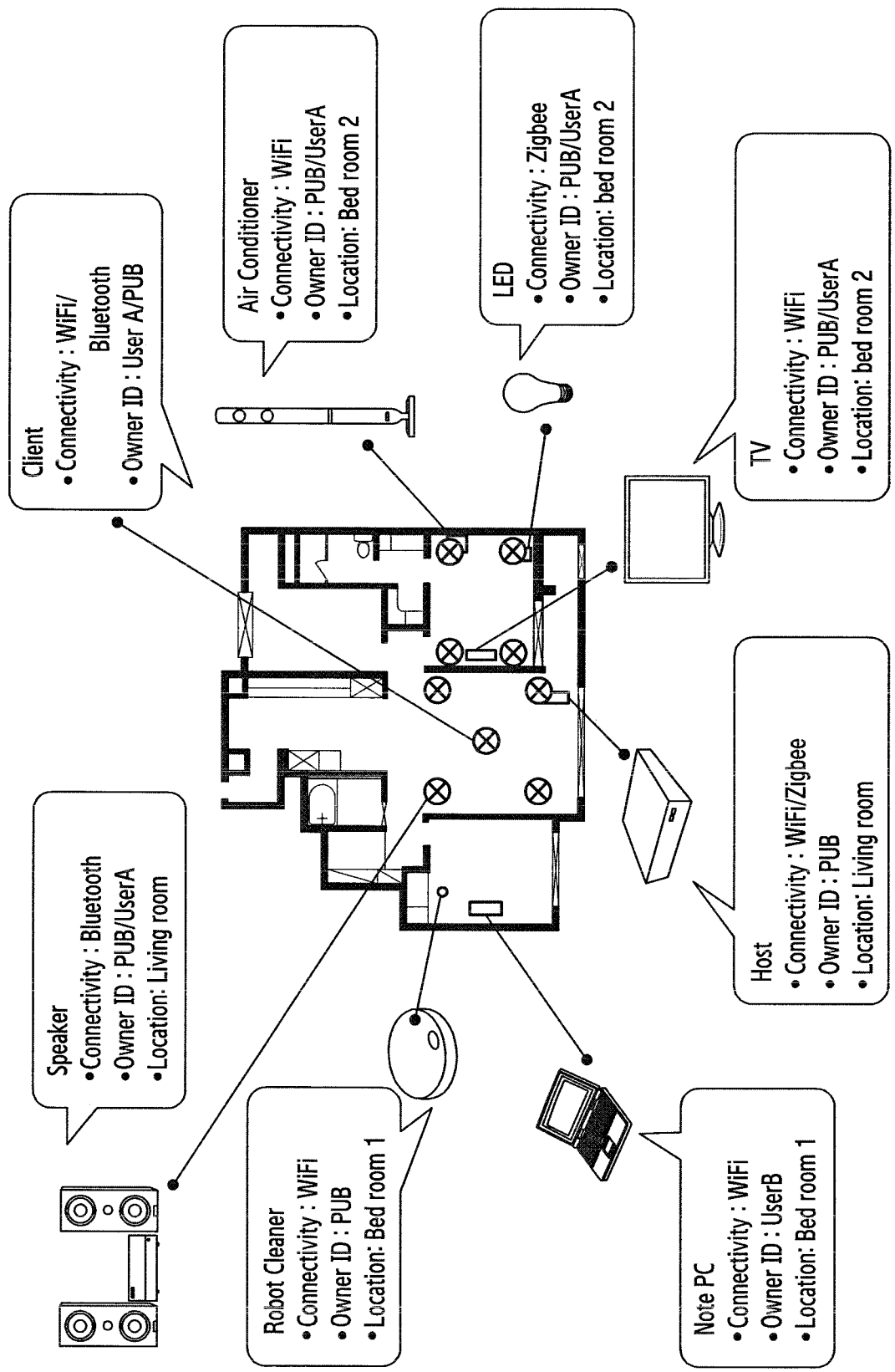
FIG. 4 is a view showing an example of location information which is displayed by a client device according to an exemplary embodiment of the present disclosure.

FIG. 3 illustrates an example of designating a location of a target device by a client according to an exemplary embodiment of the present disclosure, and FIG. 4 illustrates an example of information of target devices displayed by the client.

As shown in FIG. 3, a location of a speaker located in a living room is designated as a living room, and also, connectivity of the speaker corresponds to Bluetooth and owner information regarding authority to use the speaker corresponds to common use (PUB) or a user A. In addition, as shown in FIG. 4, owner information of a target device located in bed room 1, that is, of a laptop PC corresponds to a user B, and a TV of the target devices located in bed room 2 has connectivity corresponding to WiFi, and owner information on authority to use the TV is set to common use (Pub) or User A.

When the connectivity of a host located in the living room supports WiFi and Zigbee, but does not support Bluetooth, the host cannot use the speaker shown in FIG. 4. In this case, when the client or one or more of the target devices has connectivity of Bluetooth, a target device having connectivity of Bluetooth may be discovered. As shown in FIG. 4, the client may have the connectivity of the target device (for example, WiFi, Bluetooth, etc.) and owner information (for example, PUB, User A, etc.).

As shown in FIG. 4, since the client has the connectivity of WiFi and Bluetooth, the client can discover the speaker having the connectivity of Bluetooth. Since the client supports WiFi corresponding to the same connectivity as that of the host, the client may transmit the result of discovering to the host. Accordingly, since the host is not directly connected with the speaker, but is connected with the client, the host can control and manage the speaker based on the connectivity information on the speaker, which is transmitted from the client.

Figure 5:
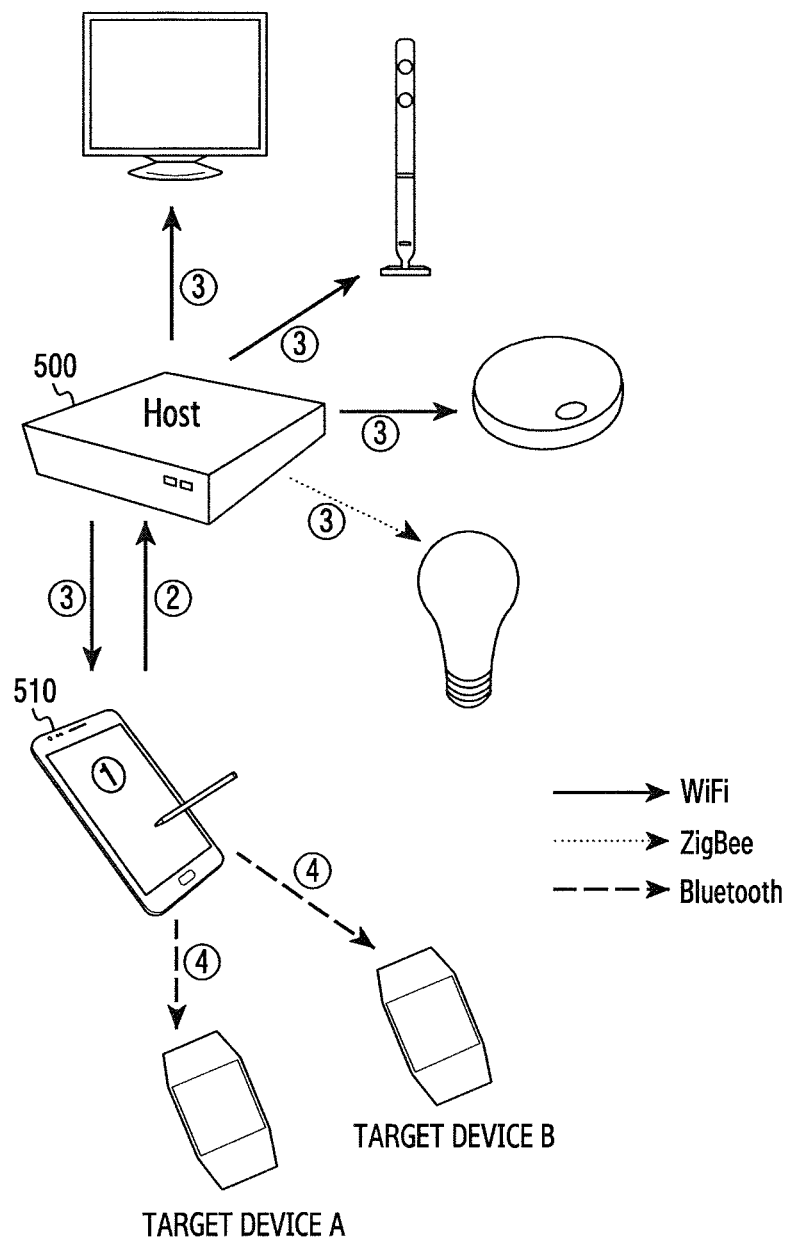
FIG. 5 is a view showing an example of managing authority based on owner identification information according to an exemplary embodiment of the present disclosure.

FIG. 5 is a view showing an example of managing authority based on owner information according to an exemplary embodiment of the present disclosure. As shown in FIG. 5, when a user executes a specific mode using a client 510 (for example, a smart phone, a tablet PC, etc.) while coming into the house at number 1, the client 510 transmits a specific mode command to a host 500 at number 2. In this case, used connectivity may be WiFi. At number 3, the host 500 transmits commands corresponding to the specific mode to target devices which are managed by the host 500. In this case, the host 500 may transmit the commands to the target devices through connectivity which can be supported by the host 500 (for example, WiFi, Zigbee, etc.)

At number 4, authority management may be performed using owner information of a target device. It is assumed that the owner of a target device A is the same as that of the client 510, and the owner of a target device B is not the same as that of the client 510. Although the target device B is connected by pairing using the client 510 based on this assumption, the client 510 cannot use all of the functions of the target device B since the owner of the client 510 is not the same as the owner of the target device B, and is limited to use only some functions allowed for common use. Accordingly, as shown in FIG. 5, the client 510 may have limitation in controlling the target device A and the target device B using the owner information of the target devices.

Figure 6:
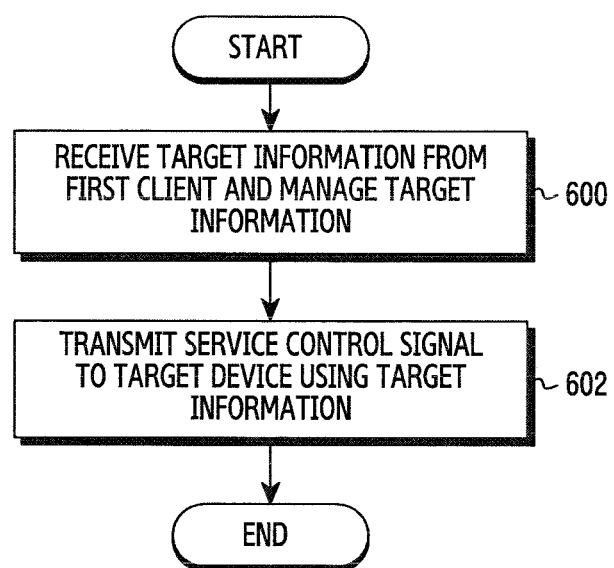
FIG. 6 is a flowchart to illustrate a method for controlling a target device in a host according to an exemplary embodiment of the present disclosure.

FIG. 6 is a flowchart to illustrate a method for controlling a target device of a host according to an exemplary embodiment of the present disclosure. The host mentioned in FIG.

6 may correspond to the host 100 of FIG. 1, and a first client may correspond to the client 110 or target device 4 150 of FIG. 1. In addition, the target device mentioned in FIG. 6 may correspond to one of target devices 1-4 120, 130, 140, and 150 of FIG. 1.

The host receives, from the first client having the same connectivity as that of at least one target device, target information on the target device, and manages the target information (S600).

Herein, the target information includes target identification information of the target device and target connectivity information of the target device, client identification information of the first client, target location information of the target device, and owner identification information regarding the authority to use the target device.

The connectivity means the capability to access a network between independent devices. For example, the connectivity includes wire/wireless network communication including full-duplex and half-duplex communication methods including Ethernet, WiFi, Bluetooth, Zigbee, Serial, USB, RF, Z-wave, etc.

The host has the same connectivity as that of the first client. In addition, the target device may have connectivity which is supported by the host or may have connectivity which is not supported by the host. For example, when the connectivity supported by the host is WiFi and Zigbee as shown in FIG. 4, the host may control a target device which has WiFi as connectivity (for example, a robot cleaner, a note PC, a TV, an air conditioner, etc.), and a target device which has Zigbee as connectivity (for example, an LED, etc.). However, when a target device has Bluetooth as connectivity, the host cannot directly control the corresponding target device since the target device does not have connectivity corresponding to the host.

The first client which has the same connectivity (for example, Bluetooth) as that of the target device having the connectivity not supported by the host transmits, to the host, target connectivity information of the target device as target information with target identification information. In this case, the first client may be a device which has a User Interface (UI) or may be a target device without a UI.

The target connectivity information is information indicating what connectivity the target device has, and, when the target device has Bluetooth as connectivity, the target connectivity information indicating Bluetooth is transmitted to the host.

In order for the first client to transmit the target connectivity information, the host and the client should have the same connectivity. For example, when the connectivity supported by the host is WiFi and Zigbee, the first client should have connectivity of at least one of WiFi or Zigbee.

The host receives unique identification information of the first client from the first client in addition to the target identification information and the target connectivity information of the corresponding target device, maps the received first client identification information onto the target identification information and the target connectivity information, and store and manage the mapped information. The first client identification information refers to a unique ID, an identifier, etc. to specify the first client. Since the host stores and manages the first client identification information with the corresponding target connectivity information, the host may identify from which client the corresponding target connectivity information is transmitted.

In addition, the host receives and stores target location information of a target device as target information. The target location information of the target device is information indicating at which point the target device is located in a predetermined space (for example, a house or an indoor area of an office) as shown in FIG. 3 or 4. This information is set at the first client and transmitted to the host, and the host maps the target location information (for example, a living room, bed room 1, bed room 2, etc.) transmitted from the first client onto the target identification information, the target connectivity information, and the first client identification information, and stores and manages the mapped information.

In addition, the host receives and stores owner identification information regarding the authority to use a target device as target information. The owner identification information is information which is set to limit the authority of a certain client to use a target device, and may be set as common identification information for allowing a device to be common to all of the users, and identification information of the first client may be set so that the authority to use a corresponding target device can be limited to the first client and a predetermined authority range. In storing and managing the owner identification information, the host stores and manages service range information to limit the authority to use the corresponding target device with respect to a client which is not identical to the corresponding owner identification information.

FIGS. 3 and 4 illustrate examples of owner identification information (Owner ID) of each of the target devices. For example, when the owner identification information is common identification information corresponding to "PUB," the owner identification information means that the corresponding target device can be shared and used by all users. When the owner identification information is designated as unique identification information of a specific client (for example, User A), the owner identification information means that the authority to use the corresponding target device is limited to the user A of the specific client. Accordingly, when the host stores and manages the owner identification information with the target connectivity information of the target device, the host may limit the authority of a client to use the target device in supporting the target device through the client afterward.

When the host is requested to provide the target connectivity information, the target location information, or the owner identification information by another client, the host provides the stored target connectivity information, target location information, or owner identification information to the corresponding client.

When receiving a service request signal regarding a target device from a second client after step S600, the host transmits a service control signal for controlling the target device to the target device using the target information (S602). The second client may be the same as the first client or may be a different client.

Herein, the service control signal is one of the signals for controlling a plurality of target devices in the host, and refers to a signal for controlling different target devices by connecting the target devices with one another.

Figure 7:
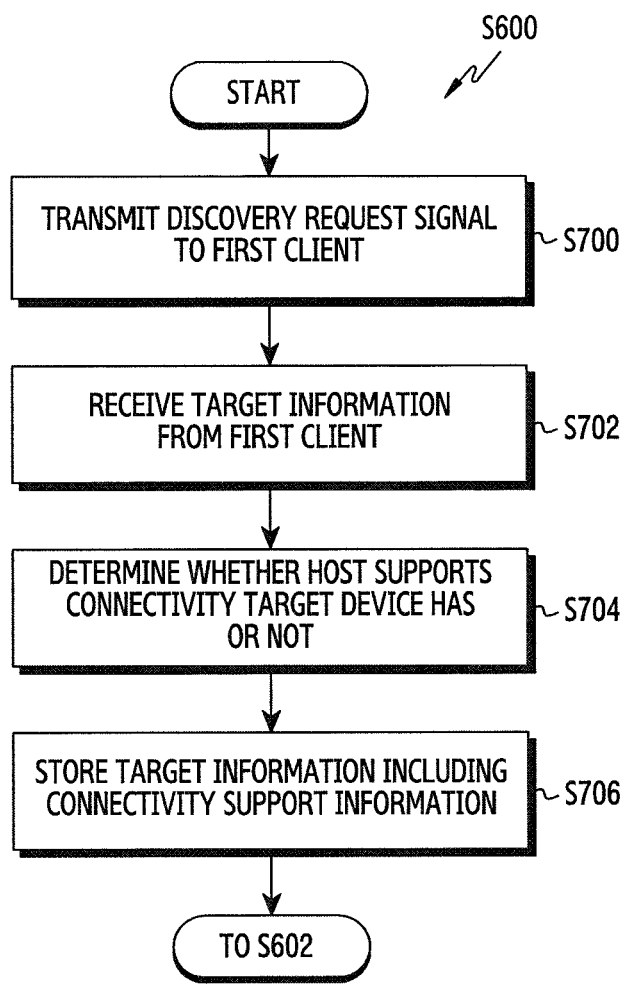
FIG. 7 is a flowchart to illustrate a process of receiving and storing target identification information and target connectivity information according to an exemplary embodiment of the present disclosure.

FIG. 7 is a flowchart to illustrate a process of receiving and managing target information (S600) according to an exemplary embodiment of the present disclosure.

The host transmits a discovery request signal for discovering the target device to the first client (S700). The host broadcasts or multicasts the discovery request signal to the client or the target device having the same connectivity as that of the host. The discovery request signal is a signal for requesting to discover a target device having the same connectivity as that of the host, and in particular, is a signal for requesting to discover another target device which does not have the same connectivity as that of the host, but has the same connectivity as that of the client or the target device which receives the discovery request signal.

After step S700, the host receives target information corresponding to the result of discovering the target device from the first client (S702). When the first client receives the discovery request signal from the host, the first client discovers the target device having the same connectivity as that of the first client. To achieve this, the first client broadcasts or multicasts a discovery signal. Accordingly, the first client extracts target information regarding the target device which is discovered by a response signal to the discovery signal, and transmits the target information to the host.

After step S702, the host determines whether the connectivity owned by the target device can be supported by the host or not using the received target information (S704). For example, on the assumption that the connectivity supported by the host is WiFi and Zigbee, when the connectivity of the corresponding target device is identified as Bluetooth based on the received target information, the host determines that the corresponding target device has the connectivity not supported by the host. Information indicating whether connectivity corresponds to the connectivity supported by the host or not is referred to as connectivity support information.

After step S704, the host stores the target information including the connectivity support information as information corresponding to the corresponding target device (S706). The connectivity support information refers to information on whether the connectivity of a target device corresponds to connectivity which can be supported by the host or not. The host maps the target connectivity information, the first client identification information, the location information of the target device, the owner identification information of the target device, the connectivity support information, etc. with one another along with the target identification information of the discovered target device, and stores the mapped information.

Figure 8:
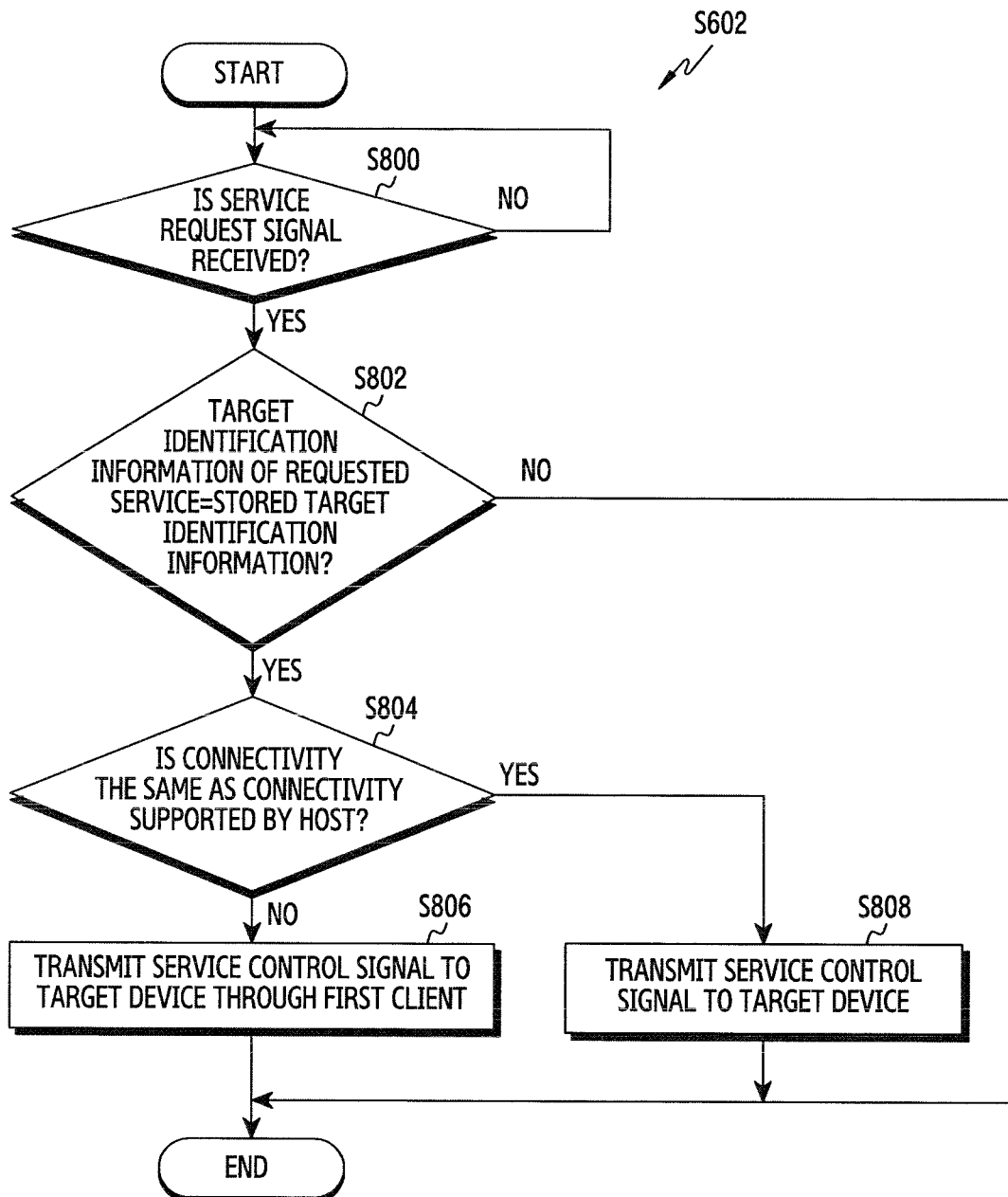
FIG. 8 is a flowchart to illustrate a process of transmitting a service control signal to a target device according to an exemplary embodiment of the present disclosure.

FIG. 8 is a flowchart to illustrate a process of transmitting a service control signal to a target device (S600) according to an exemplary embodiment of the present disclosure.

The host determines whether a service request signal regarding a target device is received from the second client or not (S800).

In step S800, when the service request signal is received from the second client, the host determines whether target identification information corresponding to the service request signal is identical to target identification information included in target information previously stored (S802). The service request signal includes target identification information regarding a target device which is a service request object. Accordingly, the host extracts the target identification information regarding the target device which is the service request object from the received service request signal, and determines whether there exists target identification information identical to the extracted target identification information from among the target identification information previously stored regarding the target devices. When there is no information identical to the extracted target identification information from among the pre-stored target identification information, the host cannot support a service regarding the corresponding target device requested by the second client. Accordingly, the host transmits an error message indicating that the host cannot support the service regarding the corresponding target device requested by the second client to the second client, and finishes the above-described process.

In step S802, when the target identification information corresponding to the service request signal is identical to the stored target identification information, the host determines whether the connectivity of the target device is the same as the connectivity supported by the host or not using connectivity support information included in the target information (S804). For example, when the connectivity supported by the host is WiFi and Zigbee, the host determines whether the connectivity support information corresponding to the stored target information corresponds to the connectivity of any one of WiFi and Zigbee.

In step S804, when the target connectivity information corresponding to the stored target identification information is not the same as the connectivity supported by the host, the host generates a service control signal for controlling the target device, and transmits the generated service control signal to the target device through the first client (S806). The target connectivity information not being the same as the connectivity supported by the host means that the host cannot directly control the target device in supporting the service. For example, when the host has WiFi and Zigbee as connectivity, but the target connectivity information has Bluetooth as connectivity information, the host cannot directly control the corresponding target device. Accordingly, in this case, the host transmits the service control signal for controlling the target device to the first client rather than the target device, and the first client transmits the service control signal to the target device under the control of the host.

In step S804, when the target connectivity information corresponding to the stored target identification information is the same as the connectivity supported by the host, the host generates a service control signal and directly transmits the generated service control signal to the target device corresponding to the target identification information (S808). The target connectivity information being the same as the connectivity supported by the host means that the host can directly control the target device in supporting the service. For example, when the host has WiFi and Zigbee as connectivity, and the target connectivity information has connectivity of WiFi or Zigbee, the host directly transmit the service control signal for controlling the target device to the target device.

Figure 9:
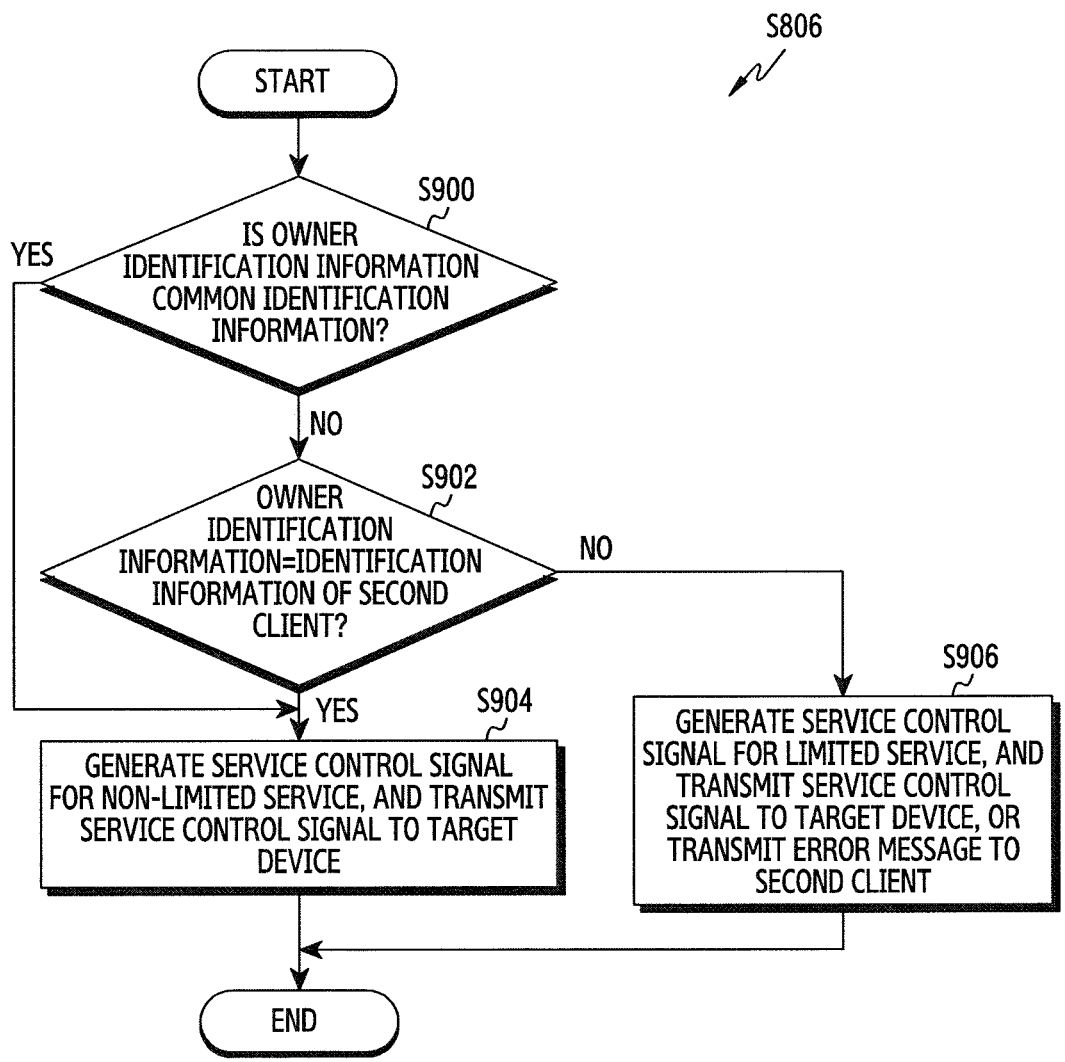
FIG. 9 is a flowchart to illustrate a process of generating a service control signal and transmitting the service control signal to a first client according to an exemplary embodiment of the present disclosure.

FIG. 9 is a flowchart to illustrate a process of generating a service control signal and transmitting the service control signal to a target device (S806) according to an exemplary embodiment of the present disclosure.

The host determines whether owner identification information of a target device corresponding to a service request signal corresponds to common identification information for allowing a service to be shared by all clients (S900). For example, the host determines whether the owner identification information of the target device corresponds to "PUB" corresponding to the common identification information or not.

In step S900, when the owner identification information does not correspond to the common identification information, the host determines whether the owner identification information is identical to identification information of the second client (S902). The owner identification information not corresponding to the common identification information indicates that the owner identification information is set and stored as identification information of a specific client to limit the authority to use the corresponding target device to the specific client.

In step S902, when the owner identification information is identical to the identification information of the second client, the host generates a service control signal for a service having a non-limited service range and transmits the generated service control signal to the target device through the first client (S904). For example, the identification information of the second client being identical to the owner identification information means that the second client which has transmitted the service request signal corresponds to an owner who has the rightful authority to use the corresponding target device. Accordingly, to support a service which has no limitation on the corresponding target device, the host generates a service control signal without limitation on the authority to use, and transmits the generated service control signal to the target device through the first client.

In addition, when the owner identification information corresponds to the common identification information in step S900, all of the clients can be supported with the service of the target device without limitation. Therefore, the host generates a service control signal without limitation on the authority to use, and transmits the generated service control signal to the target device through the first client.

However, when the owner identification information is not identical to the identification information of the second client which has transmitted the service request signal in step S902, the host generates a service control signal for a service having a limited service range, and transmit the limited service control signal to the target device through the first client, or generates an error message indicating that it is impossible to support the service, and transmits the generated error message to the second client (S906).

The identification information of the second client which has transmitted the service request signal not being identical to the owner identification information means that the second client does not have the rightful authority to use the corresponding target device. Accordingly, although there is a request for the service of the corresponding target device, the host generates the limited service control signal with reference to service range information regarding a range of use of the corresponding target device, and transmits the generated service control signal to the target device through the first client, or generates an error message indicating that it is impossible to support the service, and transmits the generated error message to the second client.

Figure 10:
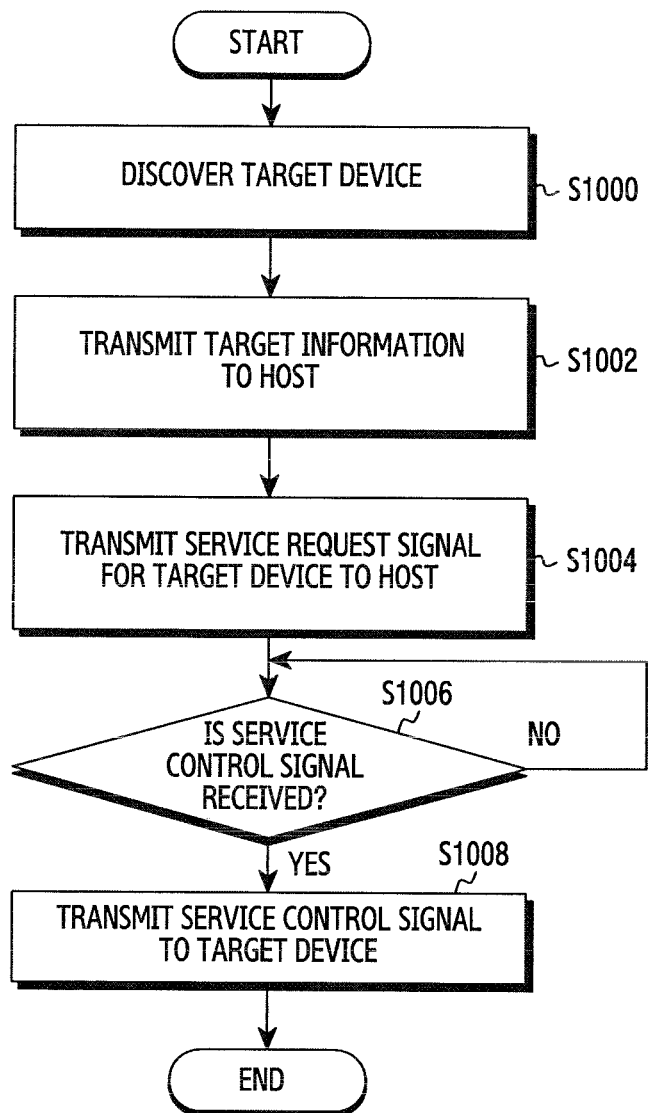
FIG. 10 is a flowchart to illustrate a method for controlling a target device of a client according to an exemplary embodiment of the present disclosure.

FIG. 10 is a flowchart to illustrate a method for controlling a target device of a client according to an exemplary embodiment of the present disclosure.

The client discovers at least one target device having the same connectivity as that of the client (S1000). The client discovers the target device having the same connectivity as that of the client (for example, Ethernet, Bluetooth, Zigbee, Serial, USB, RF, Z-wave, etc.) The client may discover the target device when receiving a discovery request signal for the target device from the host, or may periodically discover the target device regardless of a request of the host. Herein, the client may be a device which has a user interface (UI) or may be a target device without a user interface. That is, the client may correspond to the client 110 or target device 4 150 of FIG. 1.

The client broadcasts or multicasts a discovery signal to a plurality of target devices. The target devices transmit their own target connectivity information to the client with their own target identification information in response to the discovery signal. Accordingly, the client collects the target identification information and the target connectivity information of the target devices from a response signal to the discovery signal.

The target devices discovered by the client may be devices having connectivity which is supported by the host, or may be devices having connectivity which is not supported by the host. For example, when the connectivity supported by the host is WiFi and Zigbee, the client may discover a target device which has Bluetooth not supported by the host as connectivity.

After step S1000, the client transmits target information on the discovered target device to the host (S1002). The client extracts the target information on the discovered target device, and transmits the extracted target information to the host with a discovery response signal. The target information includes target identification information of the target device and target connectivity information of the target device, client identification information of the first client, target location information of the target device, and owner identification information on the authority to use the target device.

In order for the client to transmit the target information to the host, the host and the client should have the same connectivity. For example, when the connectivity supported by the host is WiFi and Zigbee, the client should have connectivity of at least one of WiFi or Zigbee.

When transmitting the target information to the host, the client transmits the identification information of the client to the host with the target identification information and the target connectivity information. The client identification information refers to a unique ID, an identifier, etc. to specify the client.

In addition, the client sets the target location information of the target device and transmits the set target location information to the host to store the target location information. The target location information is information indicating at which point the target device is located in a predetermined space (for example, a house or an indoor area of an office).

In addition, the client sets owner identification information regarding the authority to use the target device, and transmits the set owner identification information to the host to store the owner identification information. The owner identification information is information which is set to limit the authority of a certain client to use a target device, and the client may set the owner identification information to be common identification information to allow all users to share the target device, and identification information of the client is set so that the authority to use the corresponding target device can be limited to the client or a predetermined range.

The client may request, from the host, the target connectivity information, the target location information, or the owner identification information which is stored or managed by the host, and accordingly, may display the target connectivity information, the target location information, or the owner identification information transmitted from the host.

After step S1002, the client transmits a service request signal regarding a target device to the host according to a user's request (S1004). However, step S1004 is not an essential step and may be omitted when a service request signal is transmitted from another client to the host.

After step S1002 or S1004, the client determines whether a service control signal is received from the host or not (S1006). The service control signal is a control signal of the host for controlling different target devices by connecting the target devices with one another.

In step S1006, when the service control signal is received, the client transmits the received service control signal to the target device (S1008). In this case, when the owner identification information is the common identification information or the identification information of the client is identical to the owner identification information, the service control signal is a signal for the service having the non-limited service range. Accordingly, the client transmits the service control signal for the service having the non-limited service range to the target device. On the other hand, when the owner identification information is not identical to the identification information of the client, the service control signal is a signal for the service having the limited service range. Accordingly, the client transmits the service control signal for the service having the limited service range to the target device.

Figure 11:
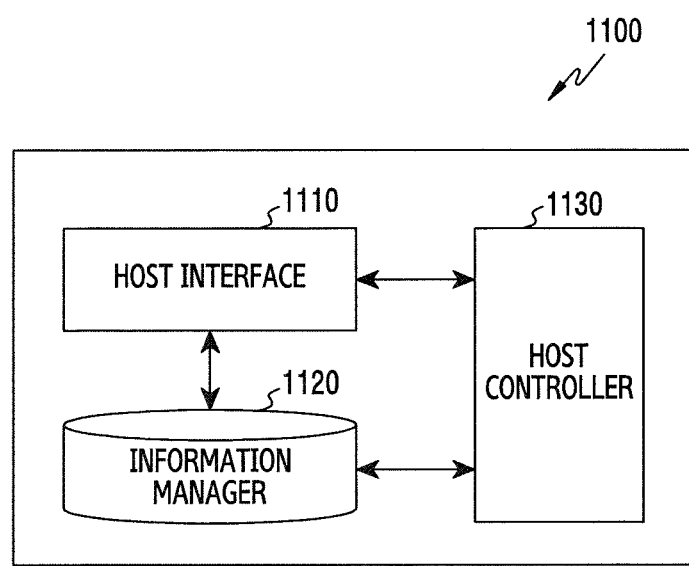
FIG. 11 is a block diagram to illustrate a device for controlling a target device of a host according to an exemplary embodiment of the present disclosure.

FIG. 11 is a block diagram to illustrate a control device 1100 of a host for a target device according to an exemplary embodiment of the present disclosure, and includes a host interface 1110, an information manager 1120, and a host controller 1130.

The host interface 1110 receives target information on a target device from the first client which has the same connectivity as that of the target device.

The host interface 1110 is responsible for wire/wireless network communication including full-duplex and half-duplex communication methods including Ethernet, WiFi, Bluetooth, Zigbee, Serial, USB, RF, Z-wave, etc., and can access a target device having the same connectivity. For example, when the connectivity supported by the host interface 1110 is WiFi and Zigbee, the host interface 1110 can access a target device which has WiFi or Zigbee as connectivity, but cannot access a target device which has Bluetooth as connectivity.

The first client which has the same connectivity as that of the target device having the connectivity which is not supported by the host interface 1110 transmits target connectivity information of the target device to the host interface 1110 with target identification information.

In order for the first client to transmit the target connectivity information to the host interface 1110, the host interface 1110 and the first client should have the same connectivity. For example, when the connectivity supported by the host interface 110 is WiFi and Zigbee, the first client should have connectivity of at least one of WiFi or Zigbee.

The host interface 1110 receives unique identification information of the first client from the first client in addition to the target identification information and the target connectivity information of the corresponding target device. In addition, the host interface 1110 receives target location information of the target device. In addition, the host receives owner identification information regarding the authority to use the target device.

The information manager 1120 stores and manages the received target information. To achieve this, the information manager 1120 includes a memory. The information manager 1120 may map the received first client identification information onto the target identification information and the target connectivity information, and store and manage the mapped information. The information manager 1120 stores and manages the first client identification information with the corresponding target connectivity information, thereby identifying from which client the corresponding target connectivity information is transmitted.

The information manager 1120 determines whether the connectivity owned by the target device corresponds to connectivity which can be supported by the host using the received target information. For example, on the assumption that the connectivity supported by the host is WiFi and Zigbee, when the connectivity of the corresponding target device is determined to be Bluetooth based on the received target information, the information manager 1120 determines that the corresponding target device has connectivity which cannot be supported by the host. The information manager 1120 stores the target information including connectivity support information as information corresponding to the corresponding target device. The connectivity support information refers to information indicating whether the connectivity of the target device corresponds to connectivity which can be supported by the host.

In addition, the information manager 1120 stores and manages the target location information of the target device which is transmitted from the first client. The information manager 1120 maps the target location information (for example, a living room, a main room, a small room, etc.) transmitted from the first client onto the target identification information, the target connectivity information, and the first client identification information, and stores and manages the mapped information.

In addition, the information manager 1120 stores and manages the owner identification information regarding the authority to use the target device, which is transmitted from the first client. The information manager 1120 maps the owner identification information (for example, common identification information or specific owner identification information) transmitted from the first client onto the target identification information, the target connectivity information, the first client identification information, and the target location information, and stores and manages the mapped information. In storing and managing the owner identification information, the information manager 1120 stores and manages service range information for limiting a range of use of the corresponding target device with respect to a client having client identification information which is not identical to the corresponding owner identification information.

The information manager 1120 may store and manage the mapped target identification information, target connectivity information, first client identification information, target location information, and owner identification in an independent storage space (for example, a database) for storing the information.

The host controller 1130 controls to transmit a discovery request signal for discovering a target device to the first client. Accordingly, the host interface 1110 receives a discovery response signal including target information corresponding to the result of discovering the target device from the first client. Accordingly, the information manager 1120 stores the received target information. In addition, when being requested to provide the stored target connectivity information, target location information, or owner identification information by the client, the host controller 1130 controls to transmit the stored target connectivity information, target location information, or owner identification information to the client. Accordingly, the host interface 1110 transmits the target connectivity information, the target location information, or the owner identification information to the client.

When receiving a service request signal for a target device from the second client, the host controller 1130 controls to generate a service control signal for controlling the target device using the target information, and transmit the service control signal to the target device. The host interface 1110 transmits the service control signal to the first client under the control of the host controller 1130, and the first client transmits the received control signal to the target device.

The host controller 1130 determines whether the service request signal for the target device is received from the second client or not. Herein, the second client may be the same client as the first client or not. When the service request signal is received from the second client, the host controller 1130 determines whether target identification information corresponding to the service request signal is identical to the target identification information previously stored. The host controller 1130 extracts target identification information of a target device corresponding to a service request object from the received service request signal, and determines whether there exists target identification information identical to the extracted target identification information from among the target identification information previously stored regarding the target devices. When there is no information identical to the extracted target identification information from among the pre-stored target identification information, the host controller 1130 cannot support a service for the corresponding target device which is requested by the second client. Accordingly, the host controller 1130 controls to transmit an error message indicating that it is not possible to support the service of the corresponding target device requested by the second client to the second client. The host interface 1110 transmits the error message to the second client under the control of the host controller 1130.

However, when the target identification information corresponding to the service request signal is identical to the stored target identification information, the host controller 1130 determines whether target connectivity information corresponding to the stored target identification information is the same as the connectivity supported by the host. For example, when the connectivity supported by the host is WiFi and Zigbee, the host controller 1130 determines whether the target connectivity information corresponding to the stored target identification information corresponds to connectivity of any one of WiFi or Zigbee.

When the target connectivity information corresponding to the stored target identification information is not the same as the connectivity supported by the host, the host controller 1130 controls to generate a service control signal for controlling the target device and transmit the generated service control signal to the target device through the first client.

The detailed operation of the host controller 1130 to control to generate and transmit the service control signal is as follows.

The host controller 1130 determines whether owner identification information of the target device corresponding to the service request signal corresponds to common identification information for allowing all clients to share the service. For example, the host controller 1130 determines whether the owner identification information of the target device corresponds to "PUB" corresponding to the common identification information or not.

When the owner identification information does not correspond to the common identification information, the host controller 1130 determines whether the owner identification information is identical to the identification information of the second client or not. When the owner identification information is identical to the identification information of the second client, the host controller 1130 controls to generate a service control signal for the service having the non-limited service range, and transmit the generated service control signal to the target device through the first client. In addition, when the owner identification information corresponds to the common identification information, all of the clients can be supported with the service of the target device without limitation, and thus the host controller 1130 controls to generate a service control signal having no limitation on the authority to use and transmit the generated service control signal to the first client. The host interface 1110 transmits the service control signal for the service having the non-limited service range to the target device through the first client under the control of the host controller 1130.

In addition, when the owner identification is not identical to the identification information of the second client which has transmitted the service request signal, the host controller 1130 controls to generate a service control signal for the service having the limited service range and transmit the limited service control signal to the target device through the first client, or controls to generate an error message indicating that it is impossible to support the service and transmit the generated error message to the second client. The host interface 1110 transmits the service control signal limiting the service range to the first client or transmits the error message to the second client under the control of the host controller 1130.

In addition, when the target connectivity information corresponding to the stored target identification information is the same as the connectivity supported by the host, the host controller 1130 controls to generate the service control signal and transmit the generated service control signal to the target device corresponding to the target identification information. For example, when the host has WiFi and Zigbee as connectivity, and the target connectivity information has connectivity of WiFi or Zigbee, the host controller 1130 controls to directly transmit the service control signal for controlling the target device to the target device. The host interface 1110 transmits the service control signal for the service having the non-limited service range to the target device under the control of the host controller 1130.

Figure 12:
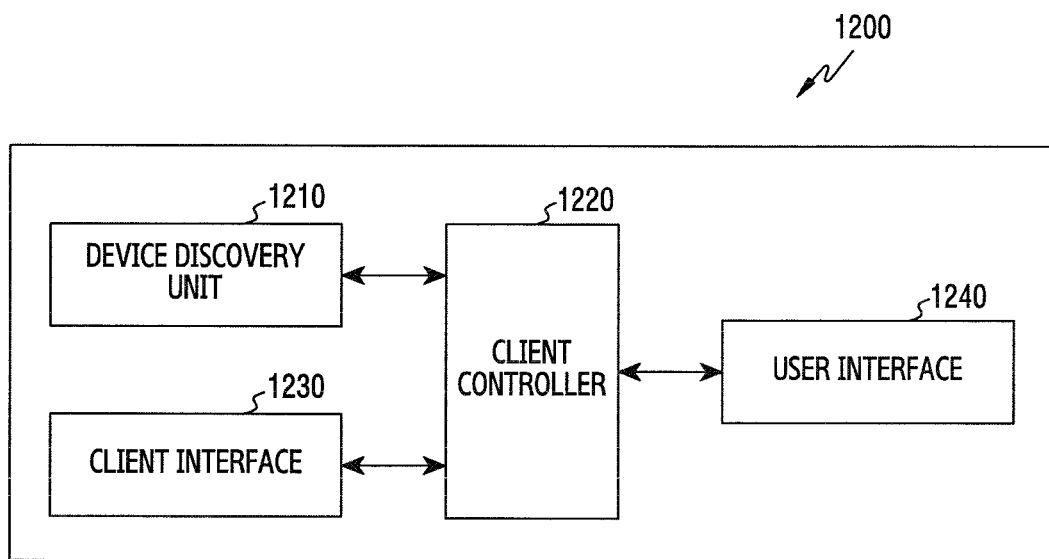
FIG. 12 is a block diagram to illustrate a device for controlling a target device of a client according to an exemplary embodiment of the present disclosure.

FIG. 12 is a block diagram to illustrate a control device 1200 of a client for a target device according to an exemplary embodiment of the present disclosure, and includes a device discovery unit 1210, a client controller 1220, a client interface 1230, and a user interface 1240.

The device discovery unit 1210 discovers a target device having the same connectivity as that of the client, and transmits the result of discovering to the client controller 1220. The device discovery unit 1210 discovers the target device having the same connectivity as that of the device discovery unit 1210 (for example, Ethernet, Bluetooth, Zigbee, Serial, USB, RF, Z-wave, etc.). The target devices discovered by the device discovery unit 1210 may be devices having connectivity which is supported by the host or may be devices having connectivity which is not supported by the host.

The device discovery unit 1210 may discover the target device when receiving a discovery request signal for the target device from the host, or may periodically discover the target device regardless of a request of the host.

The client controller 1220 controls to extract target information of the target device discovered by the device discovery unit 1210, and transmit the extracted target information to the host. When transmitting a discovery response signal including the target information to the host, the client controller 1220 controls to transmit identification information of the client with target identification information and target connectivity information.

The client interface 1230 transmits the target identification information, the target connectivity information, and the client identification information to the host under the control of the client controller 1220. In this case, in order to transmit the target identification information, the target connectivity information, and the client identification information to the host, the client interface 1230 should have the same connectivity as that of the host. For example, when the connectivity supported by the host is WiFi and Zigbee, the client interface 1230 should have connectivity of at least one of WiFi or Zigbee.

The user interface 1240 receives an input of a discovery request signal for the target device from the user. The user interface 1240 provides an input window for inputting the discovery request signal, and displays information inputted by the user.

In addition, the user interface 1240 sets target location information of the target device. The user interface 1240 provides an input window for inputting the target location information, and sets information inputted by the user as the target location information of the corresponding target device. Thereafter, the client controller 1220 controls to transmit the set target location information to the host. Then, the client interface 1230 transmits the target location information to the host under the control of the client controller 1220.

In addition, the user interface 1240 sets owner identification information regarding the authority to user the target device. The user interface 1240 provides an input window for inputting the owner identification information, and sets information inputted by the user as the owner identification information of the corresponding target device. Thereafter, the client controller 1220 controls to transmit the set owner identification information to the host. Then, the client interface 1230 transmits the owner identification information to the host under the control of the client controller 1220.

The client controller 1220 may request the target connectivity information, the target location information, or the owner identification information which is stored and managed by the host from the host. The client controller 1220 transmits a signal requesting the target connectivity information, the target location information, or the owner identification information to the host, and, when the host transmits the target connectivity information, the target location information, or the owner identification information to the client, the user interface 1240 displays the target connectivity information, the target location information, or the owner identification information transmitted from the host on a display screen.

In addition, the client controller 1220 may control to transmit a service request signal for the target device to the host according to a user's request. Accordingly, the client interface 1230 transmits the service request signal to the host.

Thereafter, when the client interface 1230 receives, from the host, a service control signal for interworking with at least one other target device, the client controller 1220 controls to transmit the service control signal to the target device.

The client controller 1220 controls to transmit a service control signal for the service having the non-limited service range or a service control signal for the service having the limited service range to the target device according to whether the identification information of the client is identical to the owner identification information. When the owner identification information is common identification information or the identification information of the client is identical to the owner identification information, the client controller 1220 controls to transmit the service control signal for the service having the non-limited service range to the target device. On the other hand, when the owner identification information is not identical to the identification information of the client, the client controller 1220 controls to transmit the service control signal for the service having the limited service range to the target device. The client interface 1230 transmits the service control signal to the target device under the control of the client controller 1220.

As described above, the present disclosure has been described with limited exemplary embodiments and drawings. However, the present disclosure is not limited to the above-described exemplary embodiments and can be modified and changed by a person skilled in the art from the descriptions provided herein.

Methods based on the embodiments disclosed in the claims and/or specification of the present disclosure may be implemented in hardware, software, or a combination of hardware and software. When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the embodiments disclosed in the claims and/or specification of the present disclosure.

The program (software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device may access via an external port to an electronic device.

What is claimed is:

1. A method for controlling a target device by a host, the method performed by the host comprising:
   receiving, from at least one target device, information related to the at least one target device supporting a first network connectivity that is supported by the host, the information related to the at least one target device including information for the host to control the at least one target device directly;
   receiving, from a first client supporting a second network connectivity that is supported by at least one other target device, information related to the at least one other target device, the information related to the at least one other target device including information for the host to control the at least one other target device indirectly through the first client;
   receiving, from a second client, a request signal for the target device; and
   transmitting, to the target device or the first client, a control signal for controlling the target device based on the information related to the target device.

2. The method of claim 1, wherein the information related to the at least one other target device comprises at least one of identification information of the at least one other target device and connectivity information of the at least one other target device, identification information of the first client, location information of the at least one other target device, and identification information of an owner having authority to use the at least one other target device.

3. The method of claim 1, wherein the receiving of the information related to the at least one other target device comprises:
   transmitting, to the first client, a signal for discovering the at least one other target device;
   receiving, from the first client, the information related to the at least one other target device corresponding to a result of discovering the at least one other target device;
   determining whether the host supports the second network connectivity based on the received information related to the at least one other target device; and
   storing an indication of whether the host supports the second network connectivity as the information related to the at least one other target device.

4. The method of claim 1, wherein the transmitting of the control signal comprises:
   determining whether identification information of the target device corresponding to the request signal is identical to the identification information of the target device included in the received information related to the target device;
   when the identification information of the target device corresponding to the request signal is identical to the identification information of the target device included in the information related to the target device, determining whether a network connectivity is identical to the first network connectivity that is supported by the host based on an indication of whether the host supports the network connectivity included in the information related to the target device; and
   when the network connectivity that is supported by the target device is not identical to the first network connectivity that is supported by the host, generating the control signal and transmitting the generated control signal to the target device through the first client.

5. The method of claim 1, wherein the transmitting of the control signal comprises:
   determining whether identification information of an owner of the target device corresponding to the request signal corresponds to common identification information for the first client and the second client;
   when the identification information of the owner of the target device does not correspond to the common identification information, determining whether the identification information of the owner of the target device is identical to identification information of the second client; and
   when the identification information of the owner of the target device is identical to the identification information of the second client, generating the control signal for a service having a non-limited service range and transmitting the generated control signal to the target device.

6. The method of claim 1, wherein the transmitting of the control signal further comprises:
   determining whether identification information of an owner of the target device corresponding to the request signal corresponds to common identification information for the first client and the second client;
   when the identification information of the owner of the target device does not correspond to the common identification information, determining whether the identification information of the owner of the target device is identical to identification information of the second client; and
   when the identification information of the owner of the target device is not identical to the identification information of the second client, generating the control signal for a service having a limited service range and transmitting the generated control signal to the target device.

7. The method of claim 1, wherein the transmitting of the control signal further comprises:
   determining whether identification information of the target device corresponding to the request signal is identical to identification information of the target device included in the received information related to the target device;
   when the identification information of the target device corresponding to the request signal is identical to the identification information of the target device included in the information related to the target device, determining whether a network connectivity is identical to the first network connectivity that is supported by the host using the indication included in the information related to the target device; and
   when the network connectivity supported by the target device is identical to the first network connectivity supported by the host, generating the control signal and transmitting the generated control signal to the target device.

8. The method of claim 1, wherein the transmitting of the control signal comprises:
   determining whether identification information of an owner of the target device corresponding to the request signal corresponds to common identification information for the first client and the second client; and
   when the identification information of the owner of the target device corresponds to the common identification information, generating the control signal for a service having a non-limited service range and transmitting the generated control signal to the target device.

9. An apparatus of a host for controlling a target device, the apparatus comprising:
   a transceiver configured to:
      receive, from at least one target device, information related to the at least one target device supporting a first network connectivity that is supported by the host, the information related to the at least one target device including information for the host to control the at least one target device directly,
      receive, from a first client supporting a second network connectivity that is supported by at least one other target device, information related to the at least one other target device, the information related to the at least one other target device including information for the host to control the at least one other target device indirectly through the first client, and
      receive a request signal for the target device from a second client; and
   a processor configured to:
      control to store the received information related to the at least one target device and the at least one other target device, and
      generate a control signal for controlling the target device based on the information related to the target device, wherein the transceiver is further configured to transmit the control signal to the target device or the first client based on the information related to the target device.

10. The apparatus of claim 9, wherein the processor is further configured to:
   control to transmit, to the first client, a signal for discovering the at least one other target device,
   when the transceiver receives, from the first client, the information related to the at least one other target device corresponding to a result of discovering the at least one other target device, determine whether the apparatus supports the second network connectivity based on the received information related to the at least one other target device, and
   store an indication of whether the apparatus supports the second network connectivity as the information related to the at least one other target device.

11. The apparatus of claim 9, wherein the processor is further configured to:
   determine whether identification information of the target device corresponding to the request signal is identical to identification information of the target device included in the received information related to the target device,
   when the identification information of the target device corresponding to the request signal is identical to the identification information of the target device included in the information related to the target device, determine whether a network connectivity is identical to the first network connectivity supported by the apparatus based on an indication of whether the apparatus supports the network connectivity included in the information related to the target device, and
   when the network connectivity that is supported by the target device is not identical to the first network connectivity that is supported by the apparatus, generate the control signal and transmit the generated control signal to the target device through the first client.

12. The apparatus of claim 9, wherein the processor is further configured to:
   determine whether identification information of an owner of the target device corresponding to the request signal corresponds to common identification information for the first client and the second client,
   when the identification information of the owner of the target device does not correspond to the common identification information, determine whether the identification information of the owner of the target device is identical to identification information of the second client, and
   when the identification information of the owner of the target device is identical to the identification information of the second client, generate the control signal for a service having a non-limited service range and transmit the generated control signal to the target device.

13. The apparatus of claim 9, wherein the processor is further configured to:
   determine whether identification information of an owner of the target device corresponding to the request signal corresponds to common identification information for the first client and the second client,
   when the identification information of the owner of the target device does not correspond to the common identification information, determine whether the identification information of the owner of the target device is identical to identification information of the second client, and
   when the identification information of the owner of the target device is not identical to the identification information of the second client, generate the control signal for a service having a limited service range and transmit the generated control signal to the target device.

14. The apparatus of claim 9, wherein the information related to the at least one other target device comprises at least one of identification information of the at least one other target device and connectivity information of the at least one other target device, identification information of the first client, location information of the at least one other target device, and identification information of an owner having authority to use the at least one other target device.

15. The apparatus of claim 9, wherein the processor is further configured to:
   determine whether identification information of the target device corresponding to the request signal is identical to identification information of the target device included in the received information related to the target device,
   when the identification information of the target device corresponding to the request signal is identical to the identification information of the target device included in the information related to the target device, determine whether the connectivity is identical to a connectivity supported by the apparatus based on an indication of whether the apparatus support the connectivity included in the information related to the target device, and
   when the connectivity supported by the target device is identical to the connectivity supported by the apparatus, generate the control signal and transmit the generated control signal to the target device.

16. The apparatus of claim 9, wherein the processor is further configured to:
   determine whether identification information of an owner of the target device corresponding to the request signal corresponds to common identification information for the first client and the second client, and
   when the identification information of the owner of the target device corresponds to the common identification information, generate the control signal for a service having a non-limited service range and transmit the generated control signal to the target device.

* * * * *